(12) United States Patent
Satake et al.

(10) Patent No.: US 9,908,349 B2
(45) Date of Patent: Mar. 6, 2018

(54) PRINTER

(71) Applicant: Toshiba Tec Kabushiki Kaisha, Tokyo (JP)

(72) Inventors: Shu Satake, Kawasaki Kanagawa (JP); Masami Yamanashi, Izunokuni Shizuoka (JP); Michio Suzuki, Kannami Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/222,052

(22) Filed: Jul. 28, 2016

(65) Prior Publication Data

US 2017/0080727 A1 Mar. 23, 2017

(30) Foreign Application Priority Data

Sep. 18, 2015 (JP) ................. 2015-185790

(51) Int. Cl.
| | |
|---|---|
| *B41J 23/32* | (2006.01) |
| *B41J 2/335* | (2006.01) |
| *B41J 3/36* | (2006.01) |
| *B41J 9/50* | (2006.01) |
| *G06F 3/12* | (2006.01) |

(52) U.S. Cl.
CPC .............. *B41J 23/32* (2013.01); *B41J 2/335* (2013.01); *B41J 3/36* (2013.01); *B41J 9/50* (2013.01); *G06F 3/121* (2013.01); *G06F 3/1229* (2013.01)

(58) Field of Classification Search
None
See application file for complete search history.

(56) References Cited

U.S. PATENT DOCUMENTS

| | | |
|---|---|---|
| 5,631,677 A | 5/1997 | Horigome et al. |
| 6,652,063 B1 | 11/2003 | Shimamura et al. |

(Continued)

FOREIGN PATENT DOCUMENTS

| | | |
|---|---|---|
| EP | 0470545 A2 | 2/1992 |
| EP | 0467648 B1 | 6/1996 |

(Continued)

OTHER PUBLICATIONS

Chinese Office Action dated Aug. 28, 2017, filed in Chinese counterpart Patent Application No. 201610565269.3 (11 pages) with English translation.

(Continued)

*Primary Examiner* — Lisa M Solomon

(74) *Attorney, Agent, or Firm* — Patterson & Sheridan, LLP

(57) ABSTRACT

According to an embodiment, a printer includes a battery, a display, a memory and a processor. The memory stores a predetermined residual capacity of the battery of the printer and amount information of a printing medium on which a predetermined printing data can be printed with the predetermined residual capacity in association with each other in advance. The processor controls the display such that the amount information corresponding to the predetermined residual capacity stored in the memory is displayed on the display, in a case where determining that the residual capacity of the battery is reduced to less than the predetermined residual capacity.

14 Claims, 10 Drawing Sheets

(56) References Cited

U.S. PATENT DOCUMENTS

2002/0033872 A1* 3/2002 Takahashi ............... B41J 29/38
347/110
2006/0164674 A1 7/2006 Someno

FOREIGN PATENT DOCUMENTS

| JP | 2000-272210 | 10/2000 |
|----|-------------|---------|
| JP | 2001-010177 | 1/2001 |
| JP | 2002-137506 | 5/2002 |
| JP | 2006-187952 | 7/2006 |
| JP | 2013-203012 | 10/2013 |
| JP | 2013-212622 | 10/2013 |
| JP | 2014-168903 A | 9/2014 |

OTHER PUBLICATIONS

Japanese Office Action dated Nov. 28, 2017, filed in Japanese counterpart Patent Application No. 2015-185790, 8 pages (with Machine translation).

* cited by examiner

PRINTER

CROSS-REFERENCE TO RELATED APPLICATION

This application is based upon and claims the benefit of priority from the prior Japanese Patent Application No. 2015-185790, filed on Sep. 18, 2015, the entire contents of which are incorporated herein by reference.

FIELD

The embodiments described hereinafter generally relates to a printer.

BACKGROUND

Recently, there is business to deliver, for example, a commodity to home of a commodity purchaser. In this delivery business, for example, in a case where the purchaser is away from the place where the commodity is delivered, a deliverer leaves an absence notification at the home of the commodity purchaser. Specifically, the deliverer issues a label or a receipt on which information of the absence notification is printed by using a portable printer and leaves the issued absence notification at the home of the commodity purchaser. Here, the information of the absence notification corresponds to, for example, information in which the purchased commodity is unable to be delivered and temporarily stored because the commodity purchaser is not at home or the like. Such a portable printer has a battery for its operation. An operator of the printer (deliverer) recognizes a battery remaining amount based on a battery residual capacity shown by the printer.

As described above, although the printer informs the operator that the battery residual capacity of the installed battery becomes low, it is difficult for the operator to recognize how many the labels or the receipts can be furthermore printed by the printer.

DETAILED DESCRIPTION

Figure 1:
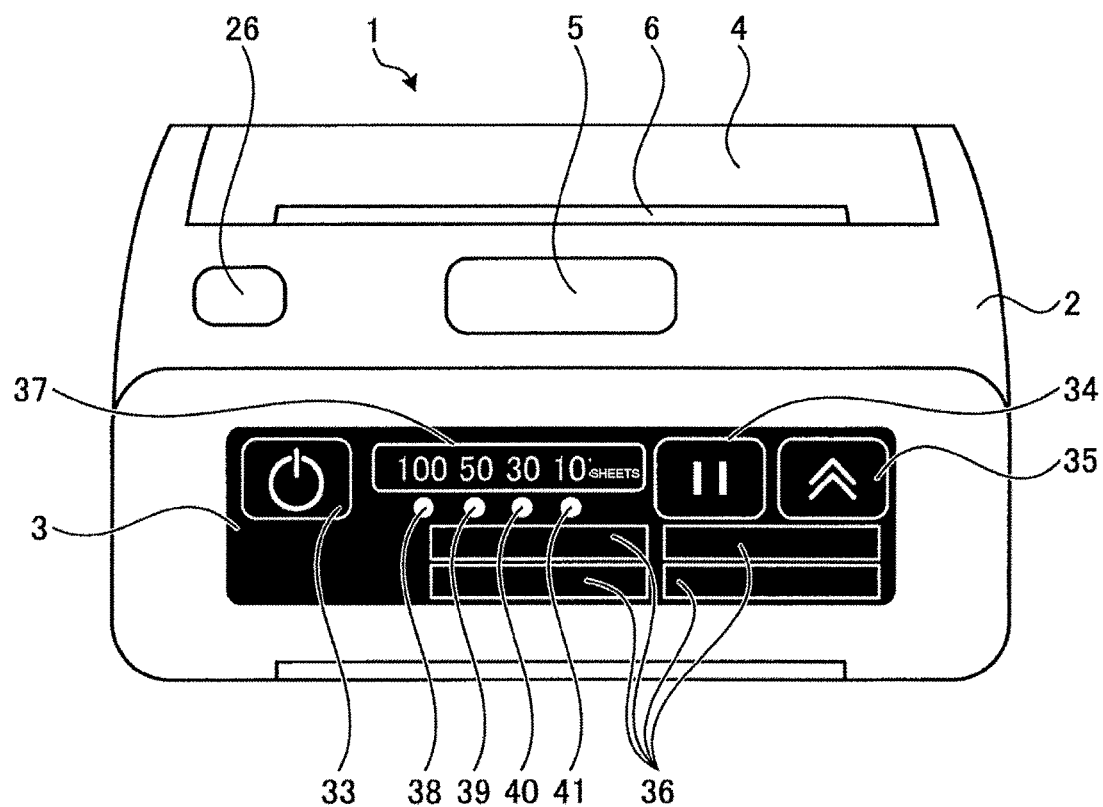
FIG. 1 is a front view illustrating an outer appearance of a printer according to a first embodiment.

According to one embodiment, a printer performs printing of a predetermined printing data onto a printing medium by means of a driving power source provided as a battery. The printer has a memory, a measuring device, a display, and a processor. The memory stores a predetermined residual capacity of the battery and amount information corresponding to a printing medium amount on which the printing data can be printed based on the predetermined residual capacity in association with each other. The measuring device measures the residual capacity of the battery. The display displays information with respect to the residual capacity of the battery. The processor judges whether the residual capacity of the battery measured by the measuring device is lower than the predetermined residual capacity or not. Further, in a case where the processor determines that the residual capacity of the battery measured by the measuring device is lower than the predetermined residual capacity, the processor controls the display such that the amount information corresponding to the predetermined residual capacity stored in the memory, as information with respect to the residual capacity of the battery, is displayed on the display.

Hereinafter, the embodiments are further described with reference to figures. In the figures, the same reference numeral shows the same or a similar component.

(First Embodiment)

A printer according to a first embodiment is described with reference to FIGS. 1 to 7. In the first embodiment, for example, a portable printer used by a deliverer who performs a delivery service of a package such as commodity while mounting the printer on the deliverer's body (for example, waist). The portable printer performs printing of a predetermined printing data onto a printing medium by means of a driving power source provided as a battery. The printer is used for performing the printing of information of an absence notification onto the printing medium, for example, a label and for issuing the label, when a commodity purchaser is absent from home to which the commodity is delivered. In the explanation described below, the portable printer is merely called a printer. Further, the first embodiment is not limited to a configuration described below.

Figure 2:
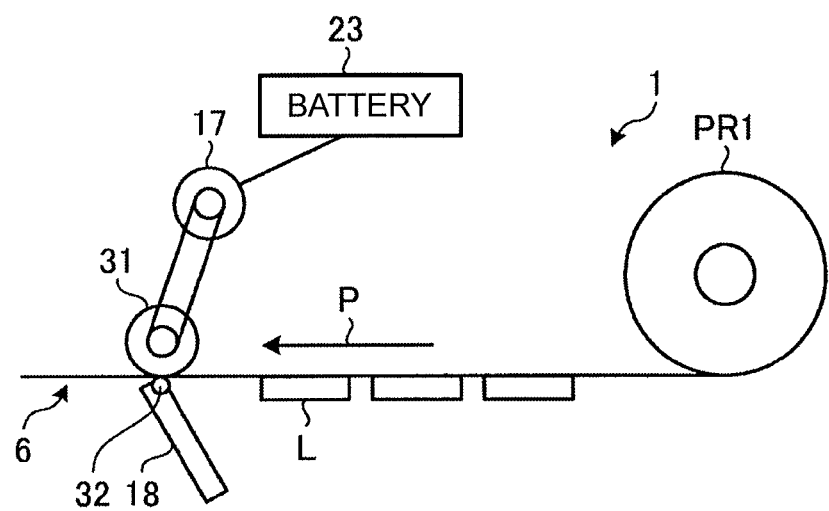
FIG. 2 is a schematic diagram illustrating a configuration with respect to conveying of a label and printing on the label in the printer according to the first embodiment.

FIG. 1 is a front view mainly illustrating an outer appearance of a printer 1 according to the first embodiment. As shown in FIG. 1, the printer 1 is formed in a substantially rectangular parallelepiped shape, and the printer 1 has a body 2 and a cover 4. As shown in FIG. 2, the printer 1 has a printing head 18, a platen roller 31, a motor 17, a battery 23, and a communication interface (communication I/F) 25 inside the body 2. The printing head 18 is, for example, formed as a thermal head having a plurality of heating elements 32 arranged linearly. Hereinafter, the printing head 18 is called a thermal head 18. The platen roller 31 is also served as a conveyance roller which conveys a label to the thermal head 18. The platen roller 31 conveys the label by rotating while holding the label between the platen roller 31 and the thermal head 18. The platen roller 31 is connected to the motor 17. The motor 17 rotates the platen roller 31. Further, the printer 1 has an opening switch 5 mounted on the body 2, and a slit 6. The opening switch 5 is formed to open the cover 4 being in a closed state. Further, the printer 1 has a circuit substrate and the like not shown inside the body 2. The inner configuration of the body 2 is described in detail below.

Further, the printer 1 has a paper supply device. The paper supply device is provided inside the body 2. A rolled paper PR1 (see FIG. 2) having an elongated mount on which labels L (see FIG. 2) with the same shape are adhered at the same intervals can be set on the paper supply device. The paper supply device of the body 2 holds the paper PR1 in a rotatable manner. The paper PR1 is set on the paper supply device in the body 2 after opening the cover 4. The printer 1 performs the printing of information of the absence notification onto the label L of the paper PR1 pulled out from the set paper PR1. The printer 1 issues the printed label L (absence notification) by discharging the printed label L from the slit 6 to the outside.

Further, the body 2 has a display 3 mounted on the front part. As shown in FIG. 1, the display 3 displays a switch 33, a switch 34, and a switch 35. The switch 33 is a power switch which receives an operation of an operator for switching On/Off of the power source. The printer 1 repeatedly switches the On/Off of the power source as the switch 33 receives the operation of the operator. The switch 34 is formed to receive an operation of the operator to temporarily stop a printing operation of the printer 1. The printer 1 repeatedly switches temporary stopping and resuming of the printing operation as the switch 34 receives the operation of the operator. The switch 35 is formed to receive an operation of the operator for feeding the label L in the printer 1. The printer 1 feeds the label L of the paper PR1 during the period in which the switch 35 is receiving the operation of the operator.

Further, in particular, a touch panel (not shown) is installed on an upper surface part of the display 3 on which the switch 33, the switch 34, and the switch 35 are displayed. The touch panel corresponding to the switch 33, the switch 34, and the switch 35 detects a pressing operation of the operator. The switch 33, the switch 34, and the switch 35 receive the operation of the operator according to the detection of the touch panel. The printer executes a processing corresponding to the switch receiving the operation of the operator.

Further, the display 3 has an error display area 36 for displaying various errors thereon. In the error display area 36, for example, letters of "cover open", "paper end", "communication error" or the like as an error message is shown. Further, in the error display area 36, an LED (Light Emitting Diode) is provided at the rear of each error message. The display 3 informs the corresponding error message by lighting the LED of the error display area 36.

Further, the display 3 has a residual number display area 37 which displays a residual printable number (amount information). In the first embodiment, numbers of "100", "50", "30", and "10" indicating the amount information are displayed linearly in a lateral direction at the same intervals in the residual number display area 37 as shown in FIG. 1. These numbers correspond to estimated numbers as to how many labels L can be furthermore printed based on the residual capacity of the battery 23, respectively. The number of "100" indicating the amount information means that the residual printable number is equal to substantially 100 sheets. The number of "50" indicating the amount information means that the residual printable number is equal to substantially 50 sheets. The number of "30" indicating the amount information means that the residual printable number is equal to substantially 30 sheets. The number of "10" indicating the amount information means that the residual printable number is equal to substantially 10 sheets.

Further, the display 3 has LEDs 38 to 41. The LEDs 38 to 41 are arranged at respective positions (below the respective numbers in the first embodiment) corresponding to the numbers indicating the amount information, respectively. Namely, the LED 38 is arranged below the number of "100", the LED 39 is arranged below the number of "50", the LED 40 is arranged below the number of "30", and the LED 41 is arranged below the number of "10". The LEDs 38 to 41 are collectively called an LED 19.

The printer 1 informs that substantially 100 sheets of the label L can be furthermore printed at a high speed by lighting the LED 38. The printer 1 informs that substantially 50 sheets of the label L can be furthermore printed at a high speed by lighting the LED 39. The printer 1 informs that substantially 30 sheets of the label L can be furthermore printed at a high speed by lighting the LED 40. The printer 1 informs that substantially 10 sheets of the label L can be furthermore printed at a high speed by lighting the LED 41. The printer 1 informs that substantially 10 sheets of the label L can be furthermore printed at a low speed by blinking the LED 41. Accordingly, based on the lighting or blinking LED 19, the operator of the printer 1 can recognize how many the labels L can be furthermore printed by the printer 1 according to the residual capacity of the battery 23.

Here, the residual capacity of electric power (hereinafter referred to as merely "residual capacity") stored in the battery 23 is related with output voltage of the battery. When the residual capacity of the battery is large, the output voltage of the battery 23 is high. Further, the output voltage of the battery 23 becomes low as the residual capacity of the battery becomes small. Namely, by measuring the output voltage of the battery 23, the residual capacity of the battery 23 can be grasped.

When the battery 23 is fully charged (for example, the output voltage of the battery 23 is 8.4 volts), the printer 1 stores the electric power capable of performing the high speed printing onto substantially 700 sheets of the labels L. In this way, in a case where the residual capacity of the electric power stored in the battery 23 is large enough (in the first embodiment, equal to or more than voltage V1 described below), any LED among the LED 38, the LED 39, the LED 40, and the LED 41 is not turned on (kept in an off state).

Further, when the printer 1 performs the printing onto the label L by using the fully charged battery 23, the residual capacity of the battery 23 is reduced as the label L is printed. In the first embodiment, a timing with respect to the residual capacity of the battery 23 to which the operator should pay attention by using the printer 1 to perform the printing on a considerable number of the label L is set to a timing in which substantially 100 sheets can be furthermore printed by using the residual capacity of the battery 23. The printer 1 informs the residual printable number of the operator since when the residual printable number becomes substantially 100 sheets.

Namely, when the residual capacity of the battery 23 is reduced to a capacity capable of performing the high speed printing onto furthermore substantially 100 sheets of the labels L, the printer 1 turns on the LED 38. At this time, the printer 1 turns off the LED 39, the LED 40, and the LED 41. Here, the capacity capable of performing the high speed printing onto furthermore substantially 100 sheets of the labels L corresponds to a residual capacity stored in the battery in a state in which the output voltage of the battery 23 is slightly lower than voltage V1. Further, when the residual capacity of the battery 23 is reduced to a capacity capable of performing the high speed printing onto furthermore substantially 50 sheets of the labels L, the printer 1 turns on the LED 39. At this time, the printer 1 turns off the LED 38, the LED 40, and the LED 41. Here, the capacity capable of performing the high speed printing onto furthermore substantially 50 sheets of the labels L corresponds to a residual capacity stored in the battery in a state in which the output voltage of the battery 23 is slightly lower than voltage V2. Further, when the residual capacity of the battery 23 is reduced to a capacity capable of performing the high speed printing onto furthermore substantially 30 sheets of the labels L, the printer 1 turns on the LED 40. At this time, the printer 1 turns off the LED 38, the LED 39, and the LED 41. Here, the capacity capable of performing the high speed printing onto furthermore substantially 30 sheets of the labels L corresponds to a residual capacity stored in the battery in a state in which the output voltage of the battery 23 is slightly lower than voltage V3. Further, when the residual capacity of the battery 23 is reduced to a capacity capable of performing the high speed printing onto furthermore substantially 10 sheets of the labels L, the printer 1 turns on the LED 41. At this time, the printer 1 turns off the LED 38, the LED 39, and the LED 40. Here, the capacity capable of performing the high speed printing onto furthermore substantially 10 sheets of the labels L corresponds to a residual capacity stored in the battery in a state in which the output voltage of the battery 23 is slightly lower than voltage V4.

In a case where the printing on the labels L is continued after the LED 41 is turned on, the residual capacity of the battery 23 is further reduced. And then, when the residual capacity of the battery 23 is reduced to a critical capacity, the printer 1 is turned into a condition in which the printer 1 unable to continue to perform the high speed printing furthermore. The critical capacity corresponds to a residual capacity stored in the battery in a state in which the output voltage of the battery 23 is slightly lower than a critical voltage V5. However, even if the residual capacity of the battery 23 is reduced to the critical capacity, a little capacity still remains. In this state of the battery, the printer 1 can perform the printing by using the residual capacity of the battery 23 under the condition in which the printer 1 does not consume much electric power (hereinafter referred to as low electric power). Thus, in the first embodiment, an operation mode of the printer 1 is switched from a normal mode described below to a saving mode in which the printer 1 can be driven by the low electric power, and the printing onto the labels L is continued. Specifically, in the saving mode, the printer 1 decreases the electric power supplied to the motor 17. Thus, a rotation speed of the motor 17 becomes low, and therefore a conveying speed of the label L of the paper PR1 by the platen roller 31 becomes low. The printer 1 performs the printing onto the label L while reducing the conveying speed of the label L of the paper PR1. The printer 1 can perform the printing onto the label L by using the low electric power in the saving mode, while it takes much time. Here, the printable number of the label L in the saving mode is, for example, substantially 10. To perform the printing furthermore is difficult because the battery 23 becomes in an over-discharged state.

Further, when the printer 1 is switched to the saving mode, the lighting LED 41 is blinked. With the blinking of the LED 41, the display 3 of the printer 1 informs the operator that the printer 1 is switched to the saving mode. A printing sound of the printer 1 performing the printing onto the label L in the normal mode is different from a printing sound of the printer 1 performing the printing onto the label L in the saving mode after being switched from the normal mode. This is mainly because of differences of rotation sounds of the motor 17 caused by differences of the rotation speeds of the motor 17 between in the normal mode and in the saving mode (high speed in the normal mode and low speed in the saving mode). On the other hand, the operator might feel suspicious about why the printing sound of the printer 1 is changed during the printing. In the first embodiment, the suspicious feeling of the operator is eliminated by informing the operator that the printer 1 is switched from the normal mode to the saving mode by the blinking the LED 41.

FIG. 2 shows a mechanism of the conveying and the printing of the label L in the body 2 of the printer 1. As shown in FIG. 2, the paper PR1 to be pulled out is set on the paper supply device in the body 2. The paper PR1 has a mount wound around a winding part of the paper supply device, and a plurality of labels L having the same shape arranged on the mount at the same intervals. A rear face of the label L is coated with an adhesive, and therefore the label L is removably adhered to the mount by the adhesive.

A front face of the label L is coated with a color developing agent which develops black color or other colors when heat is applied thereon. As shown in FIG. 2, in a conveying path of the label L, the thermal head 18 and the platen roller 31 are arranged to face each other and elastically contacted with each other. The thermal head 18 is biased upwardly and the platen roller 31 is biased downwardly by a biasing member not shown. The mount of the paper PR1 and the label L pulled out from the winding part of the paper supply device are conveyed in a direction of an arrow P and elastically held by the thermal head 18 and the platen roller 31 at a contact position of the thermal head 18 and the platen roller 31. At the contact position, the front face of the label L is contacted with the heating elements 32 linearly arranged on the thermal head 18. Further, at the contact position, the rear face of the label L is elastically contacted with the platen roller 31. The platen roller 31 is rotated by rotation of the motor 17 energized by the electric power supplied from the battery 23. When the platen roller 31 is rotated, the label L is conveyed in the direction of the arrow P. The motor 17 is rotated at a high speed by the high electric power supplied from the battery 23. When the motor 17 is rotated at the high speed, the platen roller 31 is rotated at a high speed by the motor 17. When the platen roller 31 is rotated at the high speed, the label L is conveyed at a high speed by the platen roller 31. In the normal mode, when the platen roller 31 is rotated at the high speed, the label L is conveyed at the high speed by the platen roller 31. Here, the high electric power supplied to the motor 17 from the battery 23 when the platen roller 31 conveys the label L at the high speed is hereinafter called normal electric power. Further, the motor 17 is rotated at a low speed when low electric power lower than the normal electric power is supplied to the motor 17 from the battery 23. When the motor 17 is rotated at the low speed, the platen roller 31 is rotated at a low speed by the motor 17. When the platen roller 31 is rotated at the low speed, the label L is conveyed at a low speed by the platen roller 31. In the saving mode, when the platen roller 31 is rotated at the low speed, the label L is conveyed at the low speed by the platen roller 31. The label L conveyed by the platen roller 31 and the information of the absence notification is printed thereon by the thermal head 18 is discharged from the slit 6 to the outside of the printer 1. The printer 1 issues the printed label L (absence notification) by discharging the printed label L.

Figure 3:
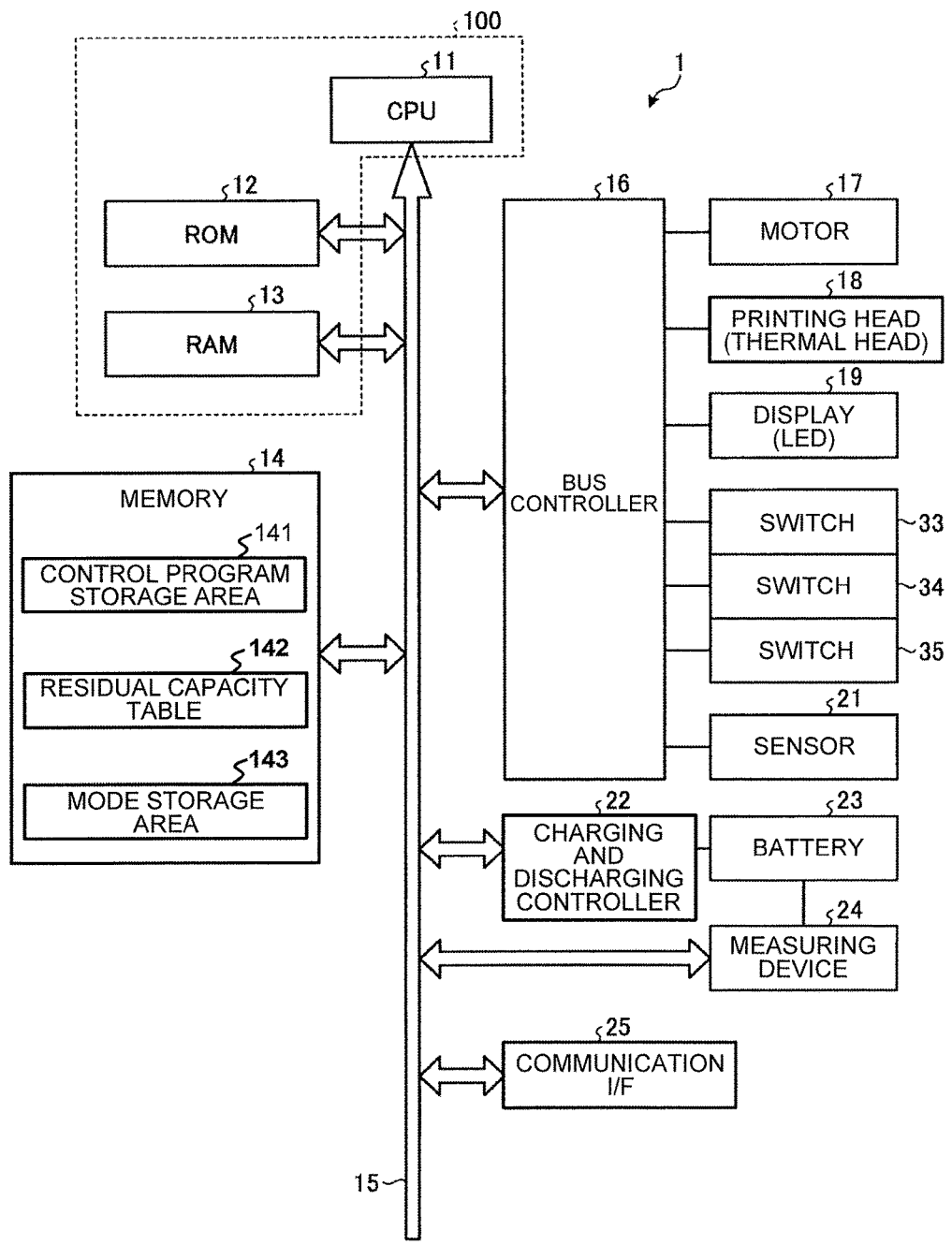
FIG. 3 is a block diagram illustrating a hardware configuration of the printer according to the first embodiment.
Figure 4:
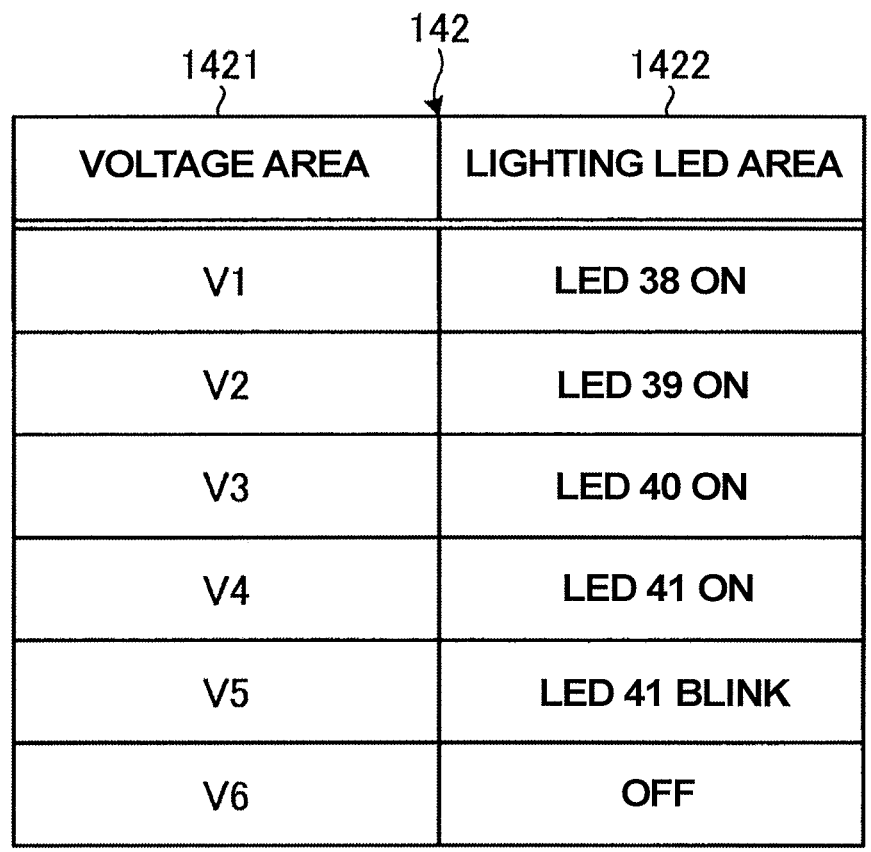
FIG. 4 is a memory map illustrating a residual capacity table installed in a memory of the printer according to the first embodiment.

Next, a hardware configuration of the printer 1 is described with reference to FIGS. 3 and 4. FIG. 3 is a block diagram illustrating the hardware configuration of the printer. As shown in FIG. 3, the printer 1 has a processor 100, a memory 14 and the like. The processor 100 has a CPU (Central Processing Unit) 11, a ROM (Read Only Memory) 12, and a RAM (Random Access Memory) 13. The CPU 11 is a core part of control of the printer 1. The ROM 12 stores various programs. The RAM 13 has a storage area in which various data is developed. The memory 14 stores various programs. The CPU 11, the ROM 12, the RAM 13, and the memory 14 are mutually connected via a data bus 15. The CPU 11 is actuated in accordance with a control program stored in the ROM 12 or the memory 14 and developed in the RAM 13, and the processor 100 executes a control processing shown in FIGS. 6 and 7.

The memory 14 is formed as a HDD (Hard Disc Drive) holding the stored information after turning off, a nonvolatile memory such as a flash memory, or the like. The memory 14 has a control program storage area 141 in which a control program is stored. Further, the memory 14 has a residual capacity table 142 and a mode storage area 143. The residual capacity table is described below in FIG. 4. The mode storage area 143 stores information corresponding to the operation mode of the printer 1. The operation mode includes, for example, the normal mode, the saving mode and a stopping mode. The mode storage area 143 stores, as described below, one of information corresponding to the normal mode, information corresponding to the saving mode, and information corresponding to the stopping mode as the operation mode of the printer 1. In a case where the capacity of the battery 23 is equal to or more than the critical capacity, the printer 1 is driven in the normal mode. In the normal mode, the platen roller 31 conveys the label L at the high speed by the normal electric power supplied from the battery 23 to the motor 17, and then the thermal head 18 performs the printing onto the label L.

On the other hand, in a case where the capacity of the battery 23 becomes below the critical capacity, the printer 1 is driven after the operation mode is switched from the normal mode to the saving mode. In the saving mode, the platen roller 31 conveys the label L at the low speed by the electric power lower than the normal electric power supplied from the battery 23 to the motor 17, and then the thermal head 18 performs the printing onto the label L.

Further, in a case where the capacity of the battery is further reduced from the critical capacity, the printer 1 switches the operation mode to the stopping mode, stops supplying the electric power from the battery 23 to the motor 17, and stops all operation in the printer 1 including the printing operation to the label L by the thermal head 18.

Further, the processor 100 is connected to the motor 17, the thermal head 18, the LED 19 (the LED 38, the LED 39, the LED 40, and the LED 41), the switch 33, the switch 34, the switch 35, and sensors 21 via the data bus 15 and a bus controller 16. The sensors 21 include a sensor for determining a home position of the label L to be printed, a sensor for determining a stopping position of the label L discharged from the slit 6, a sensor for detecting an end part of the label L, and the like.

Further, the processor 100 is connected to a charging and discharging controller 22 via the data bus 15. The charging and discharging controller 22 is connected to the battery 23. The charging and discharging controller 22 receives a control signal from the processor 100 to charge the battery 23 by means of a commercial power source not shown. Further, the charging and discharging controller 22 receives a control signal from the processor 100 to discharge the battery 23 in order to supply the electric power to the motor 17, the thermal head 18, and the LED 19. The charging and discharging controller 22 directly controls a charging and a discharging of the battery 23 by receiving the control signal from the processor 100.

Further, the processor 100 is connected to a measuring device 24 via the data bus 15. The measuring device 24 is, for example, a voltmeter connected to both terminals of the battery 23 to measure an output voltage of the battery 23. The measuring device 24 outputs the output voltage measured at a predetermined interval to the processor 100 via the data bus 15.

Further, the processor 100 is connected to the communication I/F 25 via the data bus 15. The communication I/F 25 receives a printing data from a handy terminal (not shown) as an upstream device, by using, for example, a wireless communication technique. The handy terminal in the first embodiment is, for example, served as a portable terminal which sends the information of the absence notification to the printer 1 when the purchaser is absent from home to which the commodity is delivered. The printer 1 receives the information of the absence notification from the handy terminal via the communication I/F 25.

Next, the residual capacity table 142 provided in the memory 14 is described. FIG. 4 is a memory map illustrating the residual capacity table 142 provided in the memory 14 of the printer 1. As shown in FIG. 4, the residual capacity table 142 has a voltage area 1421 and a lighting LED area 1422. The residual capacity table 142 stores output voltages V1 to V6 of the battery 23 as predetermined residual capacities of the battery 23 in the voltage area 1421 in advance. Specifically, the residual capacity table 142 stores the output voltage V1 of the battery 23 in the voltage area 1421 as the predetermined residual capacity of the battery 23 capable of performing the printing at the high speed onto substantially 100 sheets of the labels L. The residual capacity table 142 stores the output voltage V2 of the battery 23 in the voltage area 1421 as the predetermined residual capacity of the battery 23 capable of performing the printing at the high speed onto substantially 50 sheets of the labels L. The residual capacity table 142 stores the output voltage V3 of the battery 23 in the voltage area 1421 as the predetermined residual capacity of the battery 23 capable of performing the printing at the high speed onto substantially 30 sheets of the labels L. The residual capacity table 142 stores the output voltage V4 of the battery 23 in the voltage area 1421 as the predetermined residual capacity of the battery 23 capable of performing the printing at the high speed onto substantially 10 sheets of the labels L. The residual capacity table 142 stores the output voltage V5 corresponding to the critical voltage of the battery 23 in the voltage area 1421 as the predetermined residual capacity of the battery 23 capable of performing the printing onto the labels L while incapable of performing the printing at the high speed. Further, the residual capacity table 142 stores the output voltage V6 of the battery 23 in the voltage area 1421 as the predetermined residual capacity of the battery 23 incapable of performing the printing even at the low speed.

The residual capacity table 142 stores information of lighting or blinking of the LEDs 38 to 41 as the amount information of the printable label L corresponding to any of the voltages V1 to V6 in the lighting LED area 1422. Specifically, the residual capacity table 142 stores the information for lighting the LED 38 in the lighting LED area 1422 as the amount information of the label L on which the printing data can be printed in association with the voltage V1. The residual capacity table 142 stores the information for lighting the LED 39 in the lighting LED area 1422 as the amount information of the label L on which the printing data can be printed in association with the voltage V2. The residual capacity table 142 stores the information for lighting the LED 40 in the lighting LED area 1422 as the amount information of the label L on which the printing data can be printed in association with the voltage V3. The residual capacity table 142 stores the information for lighting the LED 41 in the lighting LED area 1422 as the amount information of the label L on which the printing data can be printed in association with the voltage V4. Further, the residual capacity table 142 stores the information for blinking the LED 41 in the lighting LED area 1422 as the amount information of the label L on which the printing data can be printed in association with the voltage V5.

Figure 5:
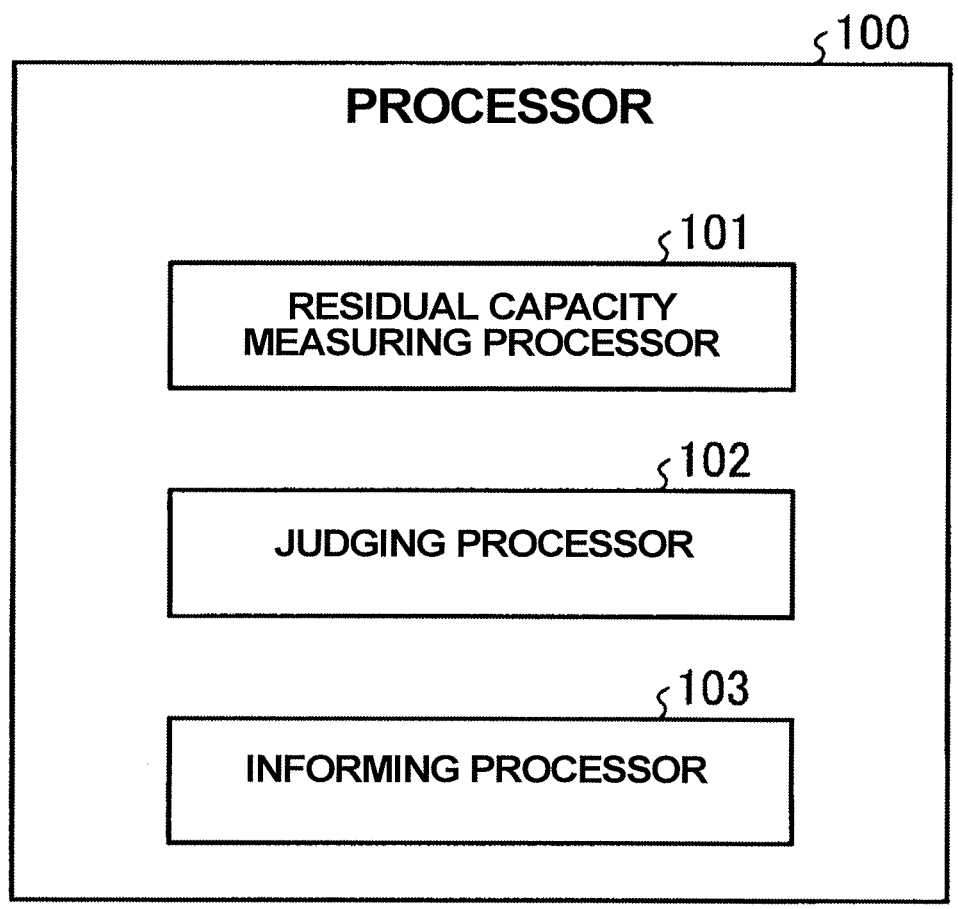
FIG. 5 is a block diagram illustrating a function configuration of the printer according to the first embodiment.

Next, a control processing of the printer 1 is described with reference to FIGS. 5 to 7. FIG. 5 is a block diagram illustrating a function configuration of the printer 1. A processor 100 is served as a residual capacity measuring processor 101, a judging processor 102 and an informing processor 103 by executing the control program stored in the ROM 12 or the control program area 141 of the memory 14.

The residual capacity measuring processor 101 receives a measured result outputted from the measuring device 24 via the data bus 15. The measured result is the output voltage of the battery 23 corresponding to the residual capacity of the battery 23. The residual capacity measuring processor 101 grasps the residual capacity of the battery 23 based on the measured result of the measuring device 24. Specifically, the residual capacity measuring processor 101 grasps the output voltage of the battery 23 as the residual capacity of the battery 23 based on the measured result of the measuring device 24. In the description below, the output voltage of the battery 23 may be used instead of the residual capacity of the battery 23. Further, in the description below, the residual capacity of the battery 23 may be used instead of the output voltage of the battery 23.

The judging processor 102 is formed to judge whether the residual capacity of the battery 23 grasped by the residual capacity measuring processor 101 is reduced to less than the predetermined residual capacity stored in the residual capacity table 142. Specifically, the judging processor 102 judges whether the output voltage of the battery 23 grasped as the residual capacity of the battery 23 is reduced to less than each of the voltages V1, V2, V3, and V4 stored in the residual capacity table 142.

The informing processor 103 is formed to inform the amount information of the label L (residual printable number of the label L) stored in the residual capacity table 142 of the memory 14 in accordance with the predetermined residual capacity when the judging processor 102 determines that the residual capacity of the battery 23 is reduced to less than the predetermined capacity. Specifically, the informing processor 103 lights one of the LEDs 38 to 41 corresponding to the amount information of the label L. As described above, the processor 100 judges whether the residual capacity of the battery 23 (the output voltage of the battery 23) measured by the measuring device is reduced to less than the predetermined residual capacity. Further, in a case where the processor 100 determines that the measured residual capacity of the battery 23 is reduced to less than the predetermined residual capacity, the processor 100 controls the LEDs 38 to 41 of the display 19 to display the amount information corresponding to the predetermined residual capacity stored in the memory 14 as information with respect to the residual capacity of the battery.

Figure 6:
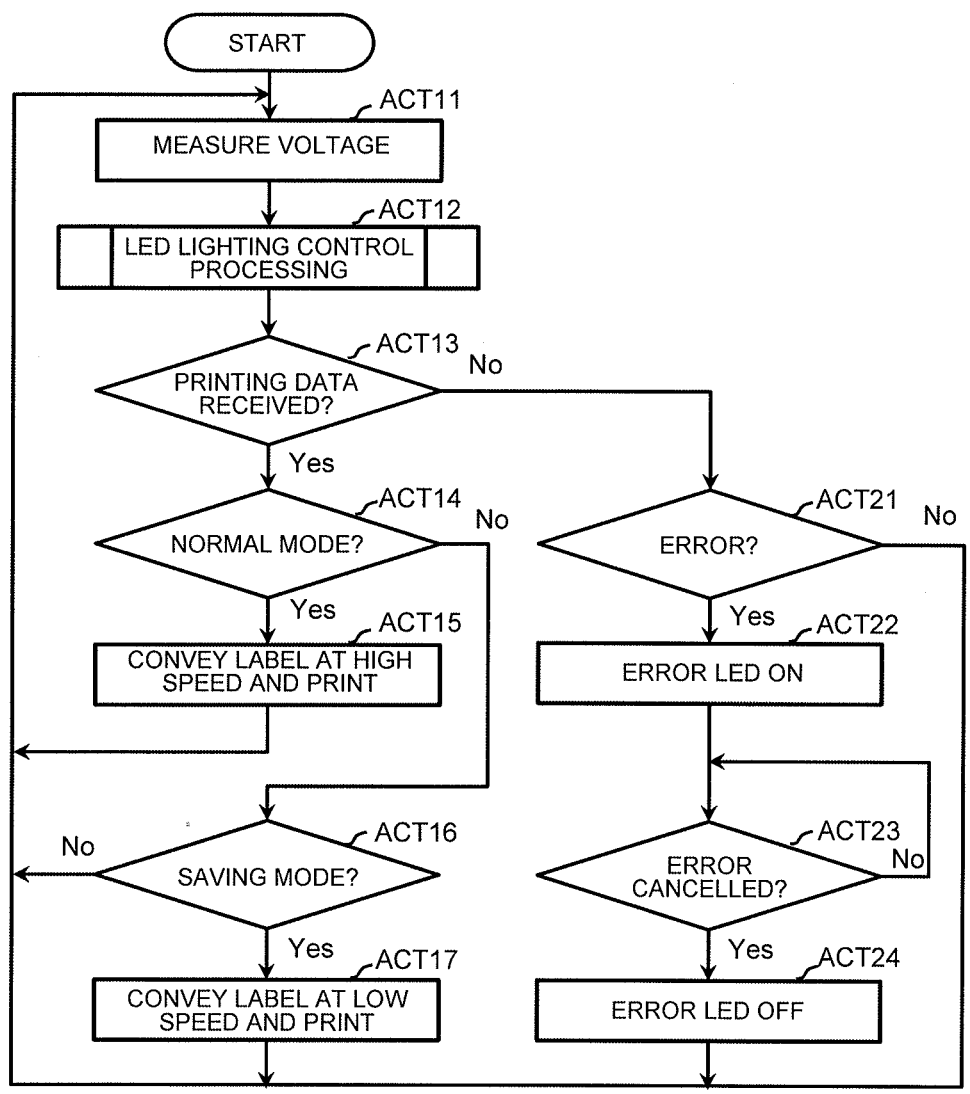
FIG. 6 is a flow chart illustrating a flow of a control processing of the printer according to the first embodiment.

FIG. 6 is a flow chart illustrating a control processing of the printer 1. As shown in FIG. 6, in an ACT 11, the processor 100 (the residual capacity measuring processor 101) receives the measured result outputted from the measuring device 24. The processor 100 (the residual capacity measuring processor 101) grasps the output voltage of the battery 23 based on the measured result of the measuring device 24. In an ACT 12, the processor 100 executes an LED lighting control processing shown in FIG. 7 based on the grasped output voltage of the battery 23.

Figure 7:
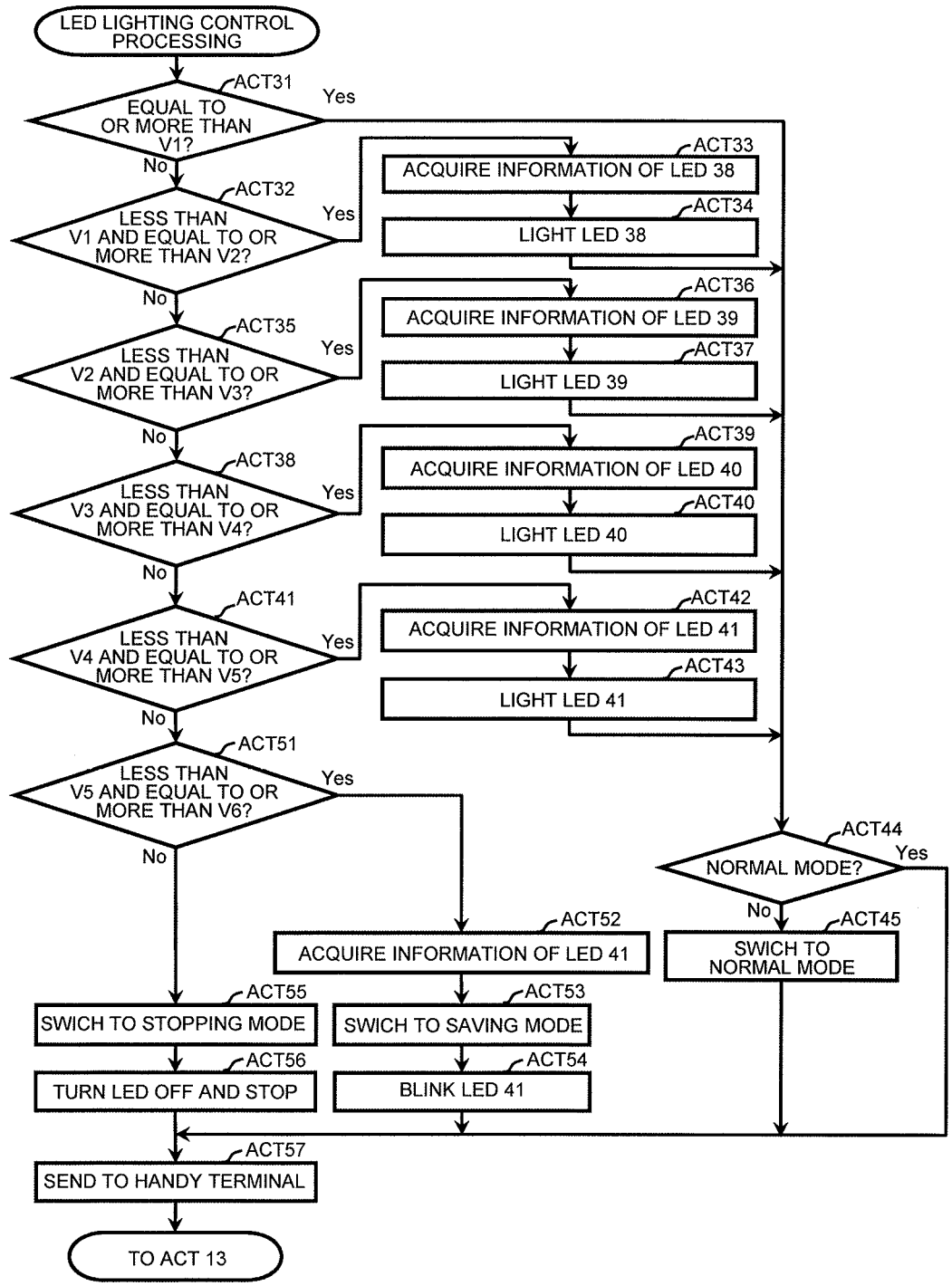
FIG. 7 is a flow chart illustrating an LED lighting control processing of the printer according to the first embodiment.

FIG. 7 is a flow chart illustrating the LED lighting control processing of the printer 1 executed in the ACT 12. As shown in FIG. 7, in an ACT 31, the processor 100 (the judging processor 102) judges whether the grasped output voltage of the battery 23 (see the ACT 11) is equal to or more than the voltage V1 (for example, 7.37 volts). In a case where the processor 100 determines that the grasped output voltage of the battery 23 is equal to or more than the voltage V1 (in the ACT 31, Yes), the processing of the processor 100 is proceeded to an ACT 44. Here, the case where output voltage of the battery 23 is equal to or more than the voltage V1 corresponds to, for example, a case where the battery 23 is fully charged. In the ACT 44, the processor 100 judges whether information corresponding to the normal mode as the operation mode of the printer 1 is stored in the mode storage area 143 of the memory 14. In a case where the processor 100 determines that the information corresponding to the normal mode is not stored in the mode storage area 143 (in the ACT 44, No), the processing of the processor 100 is proceeded to an ACT 45. In the ACT 45, the processor 100 stores the information corresponding to the normal mode as the operation mode of the printer 1 in the mode storage area 143. Further, in an ACT 57, the processor 100 sends the information of the output voltage of the battery 23 being equal to or more than the voltage V1 to the handy terminal. Further, in the ACT 44, in a case where the processor 100 determines that the information corresponding to the normal mode is stored in the mode storage area 143 (in the ACT 44, Yes), the processor 100 executes a sending processing of the ACT 57 without executing the processing of the ACT 45.

Thereafter, the residual capacity of the battery 23 is reduced from a fully charged state as the printer 1 executes a printing processing onto a certain amount of the labels L. And then, in the ACT 31, in a case where the processor 100 determines that the grasped output voltage of the battery 23 (see the ACT 11) is not equal to or more than the voltage V1 (in the ACT 31, No), the processing of the processor 100 is proceeded to an ACT 32. In the ACT 32, the processor 100 (the judging processor 102) judges whether the grasped output voltage of the battery 23 is less than the voltage V1 and equal to or more than the voltage V2 (for example, 7.28 volts). In a case where the processor 100 determines that the grasped output voltage of the battery 23 is less than the voltage V1 and equal to or more than the voltage V2 (in the ACT 32, Yes), the processing of the processor 100 is proceeded to an ACT 33. In the ACT 33, the processor 100 refers to the residual capacity table 142 of the memory 14 and acquires the information for lighting the LED 38 as information stored in the lighting LED area 1422 in accordance with the voltage V1. The information stored in the lighting LED area 1422 in accordance with the voltage V1 corresponds to information that the printing data can be printed onto substantially 100 sheets of the labels L at the high speed. The information that the printing data can be printed onto substantially 100 sheets of the labels L at the high speed corresponds to the amount information of the printing mediums (the labels L) on which the printer 1 can print the printing data based on the predetermined residual capacity of the battery 23. Namely, the amount information corresponding to the voltage V1 is the information that the printing data can be printed onto substantially 100 sheets of the labels L at the high speed. In an ACT 34, the processor 100 (the informing processor 103) lights the LED 38 based on the acquired information for lighting the LED 38. Further, the processor 100 executes the processing following the ACT 44. In this case, in the ACT 57, the processor 100 sends information that the printer 1 can perform the printing onto furthermore substantially 100 sheets of the labels L.

When the LED 38 is lit, the operator of the printer 1 can recognize that substantially 100 sheets of the labels L can be furthermore printed at the high speed based on the residual capacity of the battery 23. Further, the operator can obtain the information that substantially 100 sheets of the labels L can be furthermore printed at the high speed from the handy terminal as well.

Further, in the ACT 32, in a case where the processor 100 determines that the grasped output voltage of the battery 23 (see the ACT 11) is less than the voltage V1 but is not equal to or more than the voltage V2 (in the ACT 32, No), the processing of the processor 100 is proceeded to an ACT 35. In the ACT 35, the processor 100 (the judging processor 102) judges whether the grasped output voltage of the battery 23 is less than the voltage V2 and equal to or more than the voltage V3 (for example, 7.25 volts). In a case where the processor 100 determines that the grasped output voltage of the battery 23 is less than the voltage V2 and equal to or more than the voltage V3 (in the ACT 35, Yes), the processing of the processor 100 is proceeded to an ACT 36. In the ACT 36, the processor 100 refers to the residual capacity table 142 of the memory 14 and acquires the information for lighting the LED 39 as information stored in the lighting LED area 1422 in accordance with the voltage V2. The information stored in the lighting LED area 1422 in accordance with the voltage V2 corresponds to information that the printing data can be printed onto substantially 50 sheets of the labels L at the high speed. The information that the printing data can be printed onto substantially 50 sheets of the labels L at the high speed corresponds to the amount information of the printing mediums (the labels L) on which the printer 1 can print the printing data based on the predetermined residual capacity of the battery 23. Namely, the amount information corresponding to the voltage V2 is the information that the printing data can be printed onto substantially 50 sheets of the labels L at the high speed. In an ACT 37, the processor 100 (the informing processor 103) lights the LED 39 based on the acquired information for lighting the LED 39. Further, the processor 100 executes the processing following the ACT 44. In this case, in the ACT 57, the processor 100 sends information that the printer 1 can perform the printing onto furthermore substantially 50 sheets of the labels L.

When the LED 39 is lit, the operator of the printer 1 can recognize that substantially 50 sheets of the labels L can be furthermore printed at the high speed based on the residual capacity of the battery 23. Further, the operator can obtain the information that substantially 50 sheets of the labels L can be furthermore printed at the high speed from the handy terminal as well.

Further, in the ACT 35, in a case where the processor 100 determines that the grasped output voltage of the battery 23 (see the ACT 11) is less than the voltage V2 but is not equal to or more than the voltage V3 (in the ACT 35, No), the processing of the processor 100 is proceeded to an ACT 38. In the ACT 38, the processor 100 (the judging processor 102) judges whether the grasped output voltage of the battery 23 is less than the voltage V3 and equal to or more than the voltage V4 (for example, 7.22 volts). In a case where the processor 100 determines that the grasped output voltage of the battery 23 is less than the voltage V3 and equal to or more than the voltage V4 (in the ACT 38, Yes), the processing of the processor 100 is proceeded to an ACT 39. In the ACT 39, the processor 100 refers to the residual capacity table 142 of the memory 14 and acquires the information for lighting the LED 40 as information stored in the lighting LED area 1422 in accordance with the voltage V3. The information stored in the lighting LED area 1422 in accordance with the voltage V3 corresponds to information that the printing data can be printed onto substantially 30 sheets of the labels L at the high speed. The information that the printing data can be printed onto substantially 30 sheets of the labels L at the high speed corresponds to the amount information of the printing mediums (the labels L) on which the printer 1 can print the printing data based on the predetermined residual capacity of the battery 23. Namely, the amount information corresponding to the voltage V3 is the information that the printing data can be printed onto substantially 30 sheets of the labels L at the high speed. In an ACT 40, the processor 100 (the informing processor 103) lights the LED 40 based on the acquired information for lighting the LED 40. Further, the processor 100 executes the processing following the ACT 44. In this case, in the ACT 57, the processor 100 sends information that the printer 1 can perform the printing onto furthermore substantially 30 sheets of the labels L.

When the LED 40 is lit, the operator of the printer 1 can recognize that substantially 30 sheets of the labels L can be furthermore printed at the high speed based on the residual capacity of the battery 23. Further, the operator can obtain the information that substantially 30 sheets of the labels L can be furthermore printed at the high speed from the handy terminal as well.

Further, in the ACT 38, in a case where the processor 100 determines that the grasped output voltage of the battery 23 (see the ACT 11) is less than the voltage V3 but is not equal to or more than the voltage V4 (in the ACT 38, No), the processing of the processor 100 is proceeded to an ACT 41. In the ACT 41, the processor 100 (the judging processor 102) judges whether the grasped output voltage of the battery 23 is less than the voltage V4 and equal to or more than the voltage V5 (for example, 7.20 volts). In a case where the processor 100 determines that the grasped output voltage of the battery 23 is less than the voltage V4 and equal to or more than the voltage V5 (in the ACT 41, Yes), the processing of the processor 100 is proceeded to an ACT 42. In the ACT 42, the processor 100 refers to the residual capacity table 142 of the memory 14 and acquires the information for lighting the LED 41 as information stored in the lighting LED area 1422 in accordance with the voltage V4. The information stored in the lighting LED area 1422 in accordance with the voltage V4 corresponds to information that the printing data can be printed onto substantially 10 sheets of the labels L at the high speed. The information that the printing data can be printed onto substantially 10 sheets of the labels L at the high speed corresponds to the amount information of the printing mediums (the labels L) on which the printer 1 can print the printing data based on the predetermined residual capacity of the battery 23. Namely, the amount information corresponding to the voltage V4 is the information that the printing data can be printed onto substantially 10 sheets of the labels L at the high speed. In an ACT 43, the processor 100 (the informing processor 103) lights the LED 41 based on the acquired information for lighting the LED 41. Further, the processor 100 executes the processing following the ACT 44. In this case, in the ACT 57, the processor 100 sends information that the printer 1 can perform the printing onto furthermore substantially 10 sheets of the labels L.

When the LED 41 is lit, the operator of the printer 1 can recognize that substantially 10 sheets of the labels L can be furthermore printed at the high speed based on the residual capacity of the battery 23. Further, the operator can obtain the information that substantially 10 sheets of the labels L can be furthermore printed at the high speed from the handy terminal as well.

Further, in the ACT 41, in a case where the processor 100 determines that the grasped output voltage of the battery 23 (see the ACT 11) is less than the voltage V4 but is not equal to or more than the voltage V5 (in the ACT 41, No), the processing of the processor 100 is proceeded to an ACT 51. In the ACT 51, the processor 100 (the judging processor 102) judges whether the grasped output voltage of the battery 23 is less than the voltage V5 and equal to or more than the voltage V6 (for example, 7.00 volts). In a case where the processor 100 determines that the grasped output voltage of the battery 23 is less than the voltage V5 and equal to or more than the voltage V6 (in the ACT 51, Yes), the processing of the processor 100 is proceeded to an ACT 52. In the ACT 52, the processor 100 refers to the residual capacity table 142 of the memory 14 and acquires the information for blinking the LED 41 as information stored in the lighting LED area 1422 in accordance with the voltage V5. The information stored in the lighting LED area 1422 in accordance with the voltage V5 corresponds to information that the printing data can be printed onto substantially 10 sheets of the labels L at the low speed. The information that the printing data can be printed onto substantially 10 sheets of the labels L at the low speed corresponds to the amount information of the printing mediums (the labels L) on which the printer 1 can print the printing data based on the predetermined residual capacity of the battery 23. Namely, the amount information corresponding to the voltage V5 is the information that the printing data can be printed onto substantially 10 sheets of the labels L at the low speed. In an ACT 53, the processor 100 replaces the information of the operation mode of the printer 1 stored in the mode storage area 143 with the information corresponding to the saving mode based on the acquired information for blinking the LED 41. Namely, the processor 100 switches the operation mode of the printer 1 from the normal mode to the saving mode. In an ACT 54, the processor 100 (the informing processor 103) blinks the LED 41 based on the acquired information for blinking the LED 41. Further, the processor 100 executes the processing of the ACT 57. In this case, in the ACT 57, the processor 100 sends information that the operation mode of the printer 1 is switched to the saving mode to the handy terminal.

In particular, the processor 100 determines in the ACT 51 that the grasped output voltage of the battery 23 (see the ACT 11) is less than the voltage V5 and equal to or more than the voltage V6 (in the ACT 51, Yes) when the measuring device 24 measures plural times the output voltage of the battery 23 being less than the voltage V5 and equal to or more than the voltage V6. It is because of a characteristic of the battery 23 in which the output voltage of the battery 23 is recovered some time after the battery 23 stops supplying the electric power. Thus, at the moment when the measuring device 24 measures once the output voltage of the battery 23 being less than the voltage V5 and equal to or more than the voltage V6, the processor 100 does not determines that the grasped output voltage of the battery 23 is less than the voltage V5 and equal to or more than the voltage V6. Accordingly, when the measuring device 24 measures plural times the output voltage of the battery 23 being less than the voltage V5 and equal to or more than the voltage V6, the processor 100 determines that the grasped output voltage of the battery 23 is less than the voltage V5 and equal to or more than the voltage V6.

When the LED 41 is blinked, the operator of the printer 1 can recognize that the printer 1 is switched to the saving mode and substantially 10 sheets of the labels L can be furthermore printed at the low speed based on the residual capacity of the battery 23. Further, the operator can obtain the information that substantially 10 sheets of the labels L can be furthermore printed at the low speed from the handy terminal as well.

Further, in the ACT 51, in a case where the processor 100 determines that the grasped output voltage of the battery 23 (see the ACT 11) is equal to the voltage V6 (in the ACT 51, No), the processing of the processor 100 is proceeded to an ACT 55. In the ACT 55, the processor 100 replaces the information of the operation mode of the printer 1 stored in the mode storage area 143 with the information corresponding to the stopping mode. Namely, the processor 100 switches the operation mode of the printer 1 from the saving mode to the stopping mode. In an ACT 56, the processor 100 determines that driving the printer 1 by using the present residual capacity of the battery 23 is difficult. Specifically, the processor 100 stops the driving of the printer 1 by stopping supply of the electric power from the battery 23 to every parts in the printer 1 and turning off all the LEDs 19. And then, the processor 100 executes the processing of the ACT 57. In this case, in the ACT 57, the processor 100 sends information that the operation mode of the printer 1 is switched to the stopping mode to the handy terminal. In addition, an over-discharging of the battery 23 can be prevented by switching the printer 1 to the stopping mode.

After the processor 100 executes the processing of the ACT 57 and ends the lighting or blinking control processing of the ACT 12 LEDs in the ACT 57, the processing of the processor 100 is proceeded to an ACT 13 shown in FIG. 6. In the ACT 13, the processor 100 judges whether the printing data is received from the handy terminal. In a case where the processor 100 determines that the printing data is received from the handy terminal (in the ACT 13, Yes), the processing of the processor 100 is proceeded to an ACT 14. In the ACT 14, the processor 100 judges whether information corresponding to the normal mode as the operation mode is stored in the mode storage area 143 of the memory 14. In a case where the processor 100 determines that the information corresponding to the normal mode is stored in the mode storage area 143 (in the ACT 14, Yes), the processing of the processor 100 is proceeded to an ACT 15. In the ACT 15, the processor 100 controls the charging and discharging controller 22 in order to supply the normal electric power to the motor 17. The charging and discharging controller 22, which is under the control of the processor 100, controls the discharging of the battery 23 and supplies the normal electric power to the motor 17. The motor 17 is rotated at a high speed when the normal electric power is supplied. The motor 17 rotates the platen roller 31 at a high speed. The platen roller 31 conveys the label L at a high speed. Further, the charging and discharging controller 22 supplies the electric power to all heating elements 32 of the thermal head 18. The thermal head 18 executes a printing processing of the printing data onto the label L conveyed at the high speed. Namely, in the ACT 15, the processor 100 executes a normal electric power printing processing (a printing processing in the normal mode) in which the printing onto the label L conveyed at the high speed is performed. In other words, the processor 100 is served as a normal electric power printing processor which executes the normal electric power printing processing. After the printing processing onto one label L is executed, the processing of the processor 100 is returned to the ACT 11.

Further, in the ACT 14, in a case where the processor 100 determines that the information corresponding to the normal mode is not stored in the mode storage area 143 (in the ACT 14, No), the processing of the processor 100 is proceeded to an ACT 16. In the ACT 16, the processor 100 judges whether the information corresponding to the saving mode is stored in the mode storage area 143. In a case where the processor 100 determines that the information corresponding to the saving mode is stored in the mode storage area 143 (in the ACT 16, Yes), the processing of the processor 100 is proceeded to an ACT 17. In the ACT 17, the processor 100 controls the charging and discharging controller 22 in order to supply the low electric power lower than the normal electric power to the motor 17. The charging and discharging controller 22, which is under the control of the processor 100, controls the discharging of the battery 23 and supplies the low electric power to the motor 17. The motor 17 is rotated at a low speed when the low electric power is supplied. The motor 17 rotates the platen roller 31 at a low speed. The platen roller 31 conveys the label L at a low speed. Further, the charging and discharging controller 22 supplies the electric power to all heating elements 32 of the thermal head 18. The thermal head 18 executes a printing processing of the printing data onto the label L conveyed at the low speed. Namely, in the ACT 17, the processor 100 executes a saving electric power printing processing (a printing processing in the saving mode) in which the printing onto the label L conveyed at the low speed is performed. In other words, the processor 100 is served as a saving electric power printing processor which executes the saving electric power printing processing. At this time, since the LED 41 is blinked, the operator can recognize that the printer 1 is executing the saving electric power printing processing by visual observation to the blinking of the LED 41. Further, after the printing processing onto one label L is executed, the processing of the processor 100 is returned to the ACT 11. Further, in the ACT 16, in a case where the processor 100 determines that the information corresponding to the saving mode is not stored in the mode storage area 143 (in the ACT 16, No), the processor 100 determines that the operation mode of the printer 1 is in the stopping mode and the processing of the processor 100 is returned to the ACT 11.

On the other hand, in the ACT 13, in a case where the processor 100 determines that the printing data is not received from the handy terminal (in the ACT 13, No), the processing of the processor 100 is proceeded to an ACT 21. In the ACT 21, the processor 100 judges whether an error is occurred in the printer 1. In a case where the processor 100 determines that the error is occurred in the printer 1 (in the ACT 21, Yes), the processing of the processor 100 is proceeded to an ACT 22. In the ACT 22, the processor 100 executes an error display processing by lighting the LED in an error display area 36 corresponding to the occurred error. Next, in an ACT 23, the processor 100 judges whether the error is canceled. The processor 100 waits until the error is canceled (in the ACT 23, No). In a case where the processor 100 determines that the error is canceled (in the ACT 23, Yes), in the ACT 24, the processor 100 turns off the LED lit in the ACT 22. After turning off the LED, the processing of the processor 100 is returned to the ACT 11. Further, in the ACT 21, in a case where the processor 100 determines that the error is not occurred (in the ACT 21, No), the processing of the processor 100 is returned to the ACT 11.

Here, in the ACT 17, instead of reducing a conveying speed of the label L by reducing the rotation speed of the motor 17, the processor 100 may control the charging and discharging controller 22 and the thermal head 18 to execute an intermittent processing such that the electric power is supplied to every other heating elements 32 of the thermal head 18. By executing such an intermittent processing, similar to the processing of the ACT 17, the label L can be printed by the low electric power.

In this case, by thinning out the heating elements 32 to be actuated, the printing on the label L becomes thin and therefore a symbol such as a bar code to be optically read by an optical reading device not shown may be thin. Thus, it might be difficult for the optical reading device to read the symbol. Accordingly, in a case where a character is printed by the printer 1, the processor 100 may control the charging and discharging controller 22 and the thermal head 18 such that the electric power is supplied to every other heating elements 32 of the thermal head 18, in addition, in a case where the symbol is printed by the printer 1, the processor 100 may control the charging and discharging controller 22 and the thermal head 18 such that the electric power is supplied to all heating elements 32. With such a configuration, the symbol becomes thick and therefore to be difficult to read the symbol by the optical reading device is avoided.

For example, in a case where a printing area of the symbol on the label L is fixed, the processor 100 may control the printing operation such that the electric power is supplied to all heating elements 32 located in a certain region corresponding to the printing area to which the symbol is printed and the electric power is supplied to every other heating elements 32 located in other region. Further, the processor 100 may control the printing operation such that the electric power is supplied to all heating elements 32 only in a case where the printing operation of the printing command for printing the symbol is performed.

According to the printer 1 of the first embodiment, the processor 100 lights the corresponding LED 19 in accordance with the residual capacity of the battery 23, namely for example, the output voltage of the battery 23 measured by the measuring device 24. By lighting the LED 19, the processor 100 informs the information (amount information) of the residual printable number indicating how many labels L can be furthermore printed by the printer 1. Accordingly, the operator of the printer 1 can recognize how many labels L can be furthermore printed by number based on the residual capacity of the battery 23 installed in the printer 1.

(Second Embodiment)

A printer according to a second embodiment is described with reference to FIGS. 8 to 10. Here, in the second embodiment, it is described as one example of the printer by using a portable battery-driven printer, which prints a measured result (printing data) with respect to an infrastructures including electricity, gas, water and the like onto a receipt paper PR2 (see FIG. 9) as a printing medium. Hereinafter, the portable printer is merely called a printer 1. Further, in the second embodiment, the same reference numerals are assigned to components same as those in the first embodiment, and the explanation thereof is therefore omitted. Further, all issued receipts on which the measured result is printed have substantially the same length.

Figure 8:
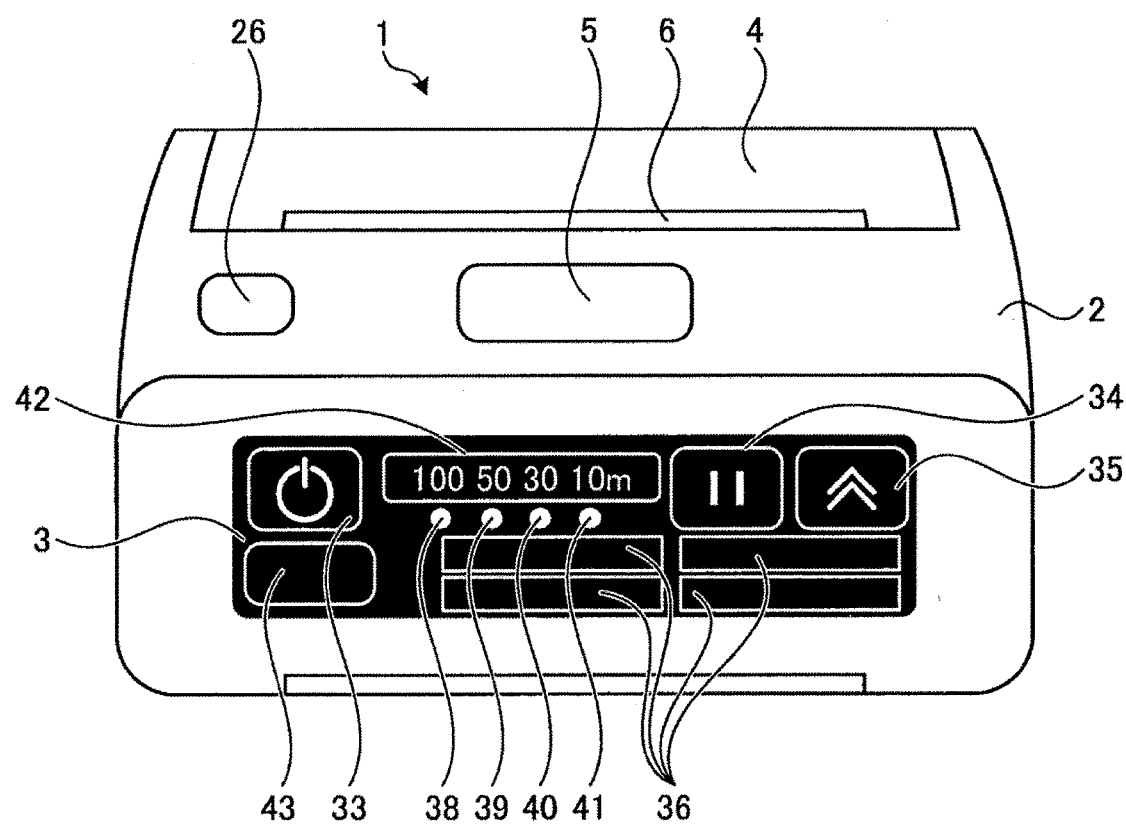
FIG. 8 is a front view illustrating an outer appearance of a printer according to a second embodiment.

FIG. 8 is a front view illustrating an outer appearance of the printer 1 according to the second embodiment. As shown in FIG. 8, a display 3 has a residual number display area 42 which displays the length (amount information) of the receipt paper PR2 (the printing medium) on which the measured result (the printing data) is printable by a predetermined residual capacity of a battery 23. In the second embodiment, numbers of "100", "50", "30", and "10" indicating the amount information are displayed linearly in a lateral direction at the same intervals in the residual number display area 42. These numbers correspond to estimated numbers as to how many meters the receipt paper PR2 can be furthermore printed based on the residual capacity of the battery 23, respectively. The number of "100" indicating the amount information means that substantially 100 meters of the receipt paper PR2 can be further more printed. The number of "50" indicating the amount information means that substantially 50 meters of the receipt paper PR2 can be further more printed. The number of "30" indicating the amount information means that substantially 30 meters of the receipt paper PR2 can be further more printed. The number of "10" indicating the amount information means that substantially 10 meters of the receipt paper PR2 can be further more printed.

Further, the display 3 has LEDs arranged at positions corresponding to the numbers (in the second embodiment, each position below each number), respectively. As shown in FIG. 8, an LED 38 is arranged below the number of "100", an LED 39 is arranged below the number of "50", an LED 40 is arranged below the number of "30", and an LED 41 is arranged below the number of "10".

Further, the printer 1 informs that substantially 100 meters of the receipt paper PR2 can be furthermore printed at a high speed based on the residual capacity of the battery 23 at the moment by lighting the LED 38. Further, the printer 1 informs that substantially 50 meters of the receipt paper PR2 can be furthermore printed at the high speed based on the residual capacity of the battery 23 at the moment by lighting the LED 39. Further, the printer 1 informs that substantially 30 meters of the receipt paper PR2 can be furthermore printed at the high speed based on the residual capacity of the battery 23 at the moment by lighting the LED 40. Further, the printer 1 informs that substantially 10 meters of the receipt paper PR2 can be furthermore printed at the high speed based on the residual capacity of the battery 23 at the moment by lighting the LED 41. Further, the printer 1 informs that substantially meters of the receipt paper PR2 can be furthermore printed at the high speed based on the residual capacity of the battery 23 at the moment by blinking the LED 41. Accordingly, based on the lighting or blinking LED 19, the operator of the printer 1 can recognize how many meters of the receipt paper PR2 can be furthermore printed by the printer 1 based on the residual capacity of the battery 23.

Further, the display 3 has a switch 43 for switching an operation mode of the printer 1 to the saving mode. In a case where an output voltage of the battery 23 corresponding to the residual capacity of the battery 23 is less than the voltage V5, when the switch 43 receives an operation of the operator, the operation mode of the printer 1 is switched from the normal mode to the saving mode.

Figure 9:
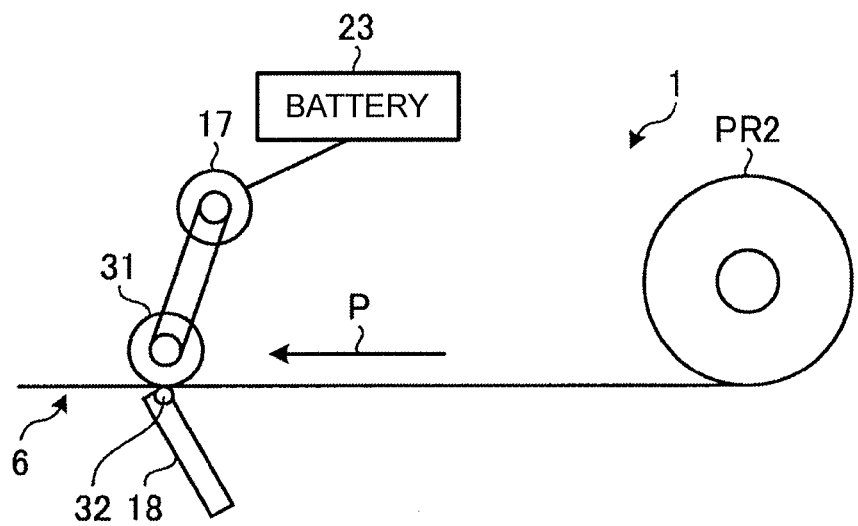
FIG. 9 is a schematic diagram illustrating a configuration with respect to conveying of a receipt paper and printing on the receipt paper in the printer according to the second embodiment.

FIG. 9 is a schematic diagram illustrating a configuration with respect to conveying of the receipt paper PR2 and printing the receipt paper PR2 in the printer 1. As shown in FIG. 9, the elongated receipt paper PR2 is held in the printer 1 in such a manner in which the receipt paper PR2 is wound. A front face of the receipt paper PR2 is coated with a color developing agent which develops black color or other colors when heat is applied thereon. The receipt paper PR2 is pulled out and conveyed in a direction of an arrow P. The receipt paper PR2 is elastically held by a thermal head 18 and a platen roller 31 at a contact position of the thermal head 18 and the platen roller 31. At the contact position, the front face of the receipt paper PR2 is contacted with a heating element 32 of the thermal head 18. Further, at the contact position, a rear face of the receipt paper PR2 is elastically contacted with the platen roller 31. The platen roller 31 is rotated by rotation of a motor 17 energized by the electric power supplied from the battery 23. When the platen roller 31 is rotated, the receipt paper PR2 is conveyed in the direction of the arrow P. When the motor 17 is rotated at a high speed by the normal electric power supplied to the motor 17 from the battery 23, the receipt paper PR2 is conveyed at a high speed by the platen roller 31. When the motor 17 is rotated at a low speed by low electric power lower than the normal electric power supplied to the motor 17 from the battery 23, the receipt paper PR2 is convey at a low speed by the platen roller 31. The receipt paper PR2 conveyed by the platen roller 31 and the measured result is printed thereon by the thermal head 18 is discharged from the slit 6 to the outside of the printer 1.

Figure 10:
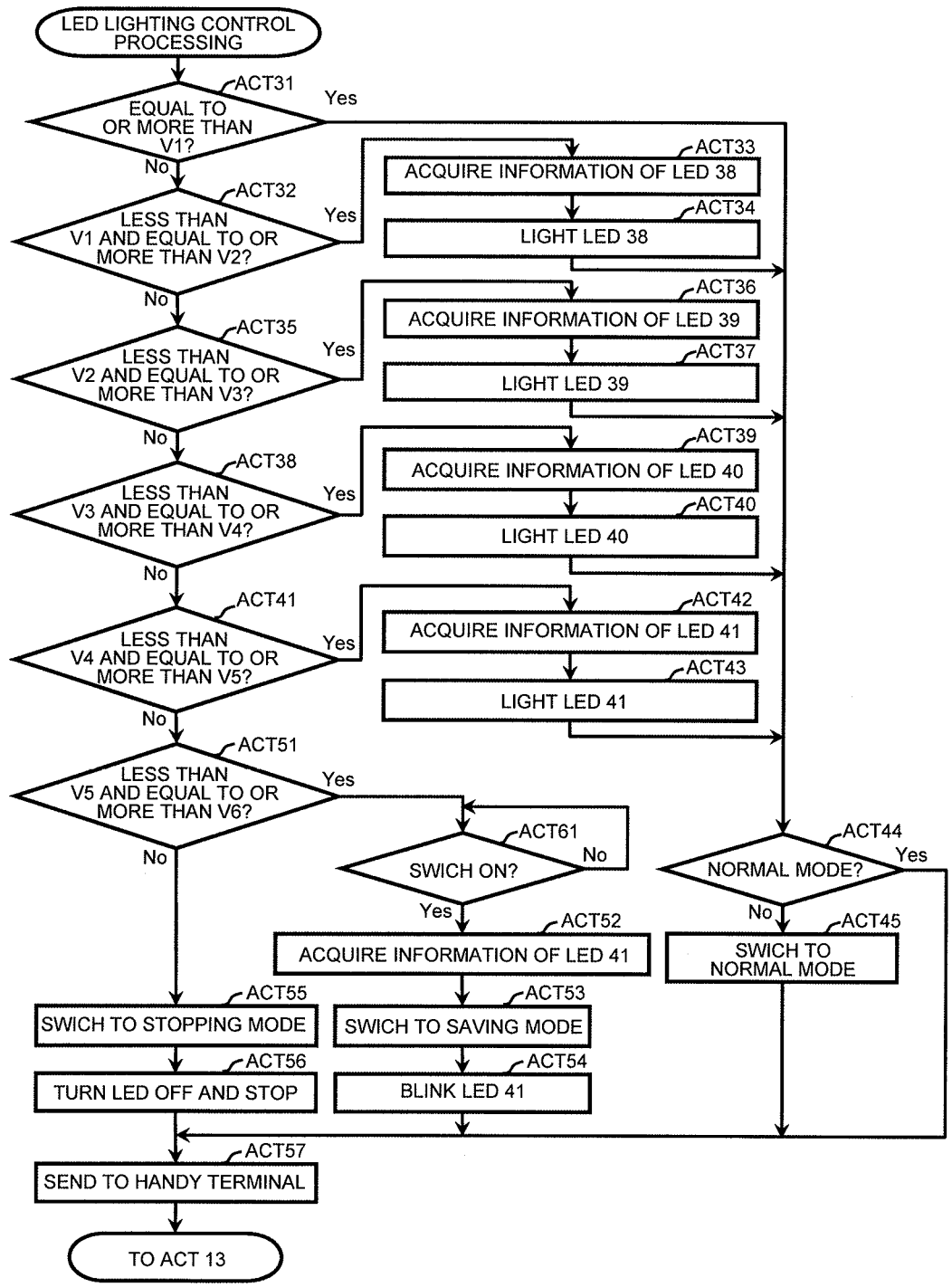
FIG. 10 is a flow chart illustrating an LED lighting control processing of the printer according to the second embodiment.

FIG. 10 is a flow chart illustrating of a part of an LED lighting control processing of the printer 1. As shown in FIG. 10, in an ACT 51, a processor 100 (judging processor 102) judges whether the grasped output voltage of the battery 23 (see the ACT 11) is less than the voltage V5 and equal to or more than the voltage V6. In a case where the processor 100 determines that the grasped output voltage of the battery 23 is less than the voltage V5 and equal to or more than the voltage V6 (in the ACT 51, Yes), the processing of the processor 100 is proceeded to an ACT 61. In the ACT 61, the processor 100 judges whether the switch 43 for switching the operation mode to the saving mode receives the operation of the operator. The processor 100 waits until the switch 43 receives the operation of the operator (in the ACT 61, No). In a case where the processor 100 determines that the switch 43 receives the operation of the operator (in the ACT 16, Yes), the processor 100 executes the processing following the ACT 52.

According to the printer 1 of the second embodiment, the processor 100 lights the corresponding LED 19 in accordance with the residual capacity of the battery 23, namely for example, the output voltage of the battery 23 measured by the measuring device 24. The processor 100 informs the information (amount information) of a printable length indicating how many meters of the receipt paper PR2 can be furthermore printed by the printer 1 by lighting the LED 19. Accordingly, the operator of the printer 1 can recognize how many meters of the receipt paper PR2 can be furthermore printed by number based on the residual capacity of the battery 23 installed in the printer 1.

In the first and the second embodiments, in the normal electric power printing processing in the ACT 15, the motor 17 is rotated at the high speed, while in the saving electric power printing processing in the ACT 17, the motor 17 is rotated at the low speed. According to such a configuration, a rotation sound of the motor 17 during the printing processing is different between in the normal electric power printing processing (the printing processing in the normal mode) and in the saving electric power printing processing (the printing processing in the saving mode). Thus, the operator might feel suspicious about why printer 1 emits different sounds.

Each of printers according to the first and the second embodiments has the following configuration as described above. The printer 1 can also solve the problem with respect to the sound described above by the configuration described below. The printer 1 measures the residual capacity of the battery 23 by using the measuring device 24. The measuring device 24 outputs the measured result to the processor 100.

The processor 100 is served as the residual capacity measuring processor 101, the judging processor 102, the normal electric power printing processor, the saving electric power printing processor, and the informing processor 103 as described above by executing the program stored in the control program area 141 of the memory 14. The processor 100 (the residual capacity measuring processor 101) receives the measured result of the measuring device 24. The processor 100 (the residual capacity measuring processor 101) grasps the residual capacity of the battery 23 based on the measured result of the measuring device 24. The processor 100 (the judging processor 102) judges whether the grasped residual capacity of the battery 23 is reduced to less than a predetermined residual capacity. The predetermined residual capacity corresponds to the residual capacity of the battery 23 capable of executing the printing processing onto a predetermined amount (number of sheet or length) of the printing medium (the label L or the receipt paper PR2) by the printer 1. In a case where the processor 100 (the judging processor 102) determines that the grasped residual capacity of the battery 23 is not reduced to less than the predetermined residual capacity (the grasped residual capacity of the battery 23 is equal to or more than the predetermined residual capacity), the processor 100 (the normal electric power printing processor) executes the normal electric power printing processing (see the ACT 15). In a case where the processor 100 (the judging processor 102) determines that the grasped residual capacity of the battery 23 is reduced to less than the predetermined residual capacity, the processor 100 (the saving electric power printing processor) executes the saving electric power printing processing (see the ACT 17). The processor 100 (the informing processor 103) informs the execution of the saving electric power printing processing. The processor 100 (the informing processor 103) informs the execution of the saving electric power printing processing by using the display 3. Further, the processor 100 (the informing processor 103) blinks the LED 41 of the display 3 in order to inform the execution of the saving electric power printing processing. Further, the processor 100 (the saving electric power printing processor) executes the printing processing onto the printing medium while conveying the printing medium by controlling the charging and discharging controller such that the low electric power is supplied from the battery 23 to the motor 17. Further, the processor 100 (the saving electric power printing processor) controls the printing head with a plurality of printing elements (the heating elements 32) of the printing head (the thermal head 18) being thinned out and driven. Further, in a case where the switch 43 for switching the operation mode of the printer 1 to the saving mode receives the operation of the operator, the processor 100 (the saving electric power printing processor) executes the saving electric power printing processing.

In the printer 1 according to the embodiments, since the execution of the saving electric power printing processing is informed by the processor 100 (the informing processor 103), the operator can recognize the execution of the saving electric power printing processing in accordance with the informing. Accordingly, the operator does not feel suspicious when the sound emitted from the printer is changed.

For example, in the first embodiment, the upstream device of the printer 1 is described as the handy terminal which performs the printing on the label L the information of the absence notification during the delivery, and in the second embodiment, the upstream is described as the handy terminal which performs the printing the measured result with respect to the infrastructures including electricity, gas, water and the like. However, the upstream device of the printer 1 is not limited to those. For example, the upstream device of the printer 1 may be provided as a handy terminal possessed by those who peddle medicines, or a handy terminal possessed by a route sales person of the online supermarkets.

Further, in the embodiments, the printer is described as the portable printer 1. However, the printer is not limited to this. The printer may be formed as a stationary printer having a battery.

Further, in the embodiments, in the processing of the processor 100 in the ACT 54, the LED 41 is blinked. However, it is not limited to this. A configuration in which a luminescence color of the LED 41 is changed may be adopted. Further, another LED may be blinked with or instead of the LED 41.

Further, in the embodiments, four kinds of sheet numbers including 100 sheets, 50 sheets, 30 sheets, and 10 sheets are displayed by using numbers of "100", "50", "30", and "10" in the residual number display area 37. Further, four kinds of lengths including 100 meters, 50 meters, 30 meters, and 10 meters are displayed by using numbers of "100", "50", "30", and "10" in the residual number display area 42. However, the displayed numbers are not limited to these. The displayed number may be one or more. However, to display a plurality of numbers is preferable.

Further, in the embodiments, the printer 1 is described as the thermal printer having the thermal head 18 and the heating element 32. However, it is not limited to this. The printer 1 may be formed as, for example, a battery-driven inkjet printer.

Further, in the embodiments, in the ACT 51, in a case where the output voltage of the battery 23 is less than the voltage V5 and equal to or more than the voltage V6 (in the ACT 51, Yes), the processor 100 switches the operation mode of the printer 1 to the saving mode, and then in the ACT 17, the processor 100 executes the printing processing while conveying the label L at the low speed. Namely, in the ACT 17, many labels L are printable as long as the output voltage of the battery 23 is less than the voltage V5 and equal to or more than the voltage V6. On the other hand, as to the sheet number of the label L to be printed in the ACT 17 after the operation mode of the printer 1 is switched to the saving mode, it may be formed that the sheet number is counted by a counter and the printing processing in the ACT 17 is stopped when a value of the counter reaches a predetermined sheet number (for example, 10 sheets).

Here, the program executed in the printer 1 according to the embodiments is provided as an installable type or an executable type file stored in a recording medium readable by a computer. Examples of the recording medium readable by the computer include a CD-ROM, a flexible disc (FD), a CD-R, and a DVD (Digital Versatile Disc).

Further, the program executed in the printer 1 according to the embodiments may be provided by being stored in a computer connected to a network such as the Internet and downloaded via the network. Further, the program executed in the printer 1 according to the embodiments may be provided or delivered via a network such as the Internet.

Further, the program executed in the printer 1 according to the embodiments may be provided by being stored in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer for printing data onto a printing medium using a battery as a power source, comprising:
    a measuring device that measures a residual capacity of the battery;
    a display for displaying information related to the residual capacity of the battery; and
    a processor that
        determines whether the residual capacity of the battery, as measured by the measuring device, is less than a predetermined residual capacity value, and
        controls the display to display amount information corresponding to a length of the printing medium that can be printed based on the residual capacity of the battery when the residual capacity of the battery is less than the predetermined residual capacity value.

2. The printer according to claim 1 further comprising:
    a memory that stores amount information corresponding to the length of the printing medium that can be printed when the battery has a measured residual capacity equal to the predetermined residual capacity value.

3. The printer according to claim 2, wherein the memory stores a plurality of different residual capacity values, each of the different residual capacity values being associated with information including a different length of the printing medium that can be printed when the battery has the measure residual capacity equal to a particular one the different residual capacity values in the plurality of the residual capacities values.

4. The printer according to claim 3, wherein
    the processor determines whether the residual capacity of the battery, as measured by the measuring device, is less than any one of the different residual capacity values every time a printing is performed.

5. A printer for printing data onto a printing medium using a battery as a power source, comprising:
    a measuring device that measures a residual capacity of the battery;
    a display for displaying information related to the residual capacity of the battery;
    a printing head that performs the printing onto the printing medium based on the printing data;
    a platen roller that conveys the printing medium by rotating while holding the printing medium to the printing head;
    a motor that rotates the platen roller;
    a charging and discharging controller that supplies electric power to the printing head and the motor from the battery by controlling a charging and discharging of the battery;
    a memory that stores a predetermined residual capacity value of the battery in association with amount information indicating an amount of the printing medium that can be printed with printing data when the battery has the predetermined residual capacity value; and
    a processor that
        determines whether the residual capacity of the battery, as measured by the measuring device, is less than the predetermined residual capacity value,
        in a case where the processor determines that the residual capacity of the battery is not less than the predetermined residual capacity value, controls the charging and discharging controller such that normal electric power is supplied to at least the motor, and
        in a case where the processor determines that the residual capacity of the battery is less than the predetermined residual capacity value, controls the charging and discharging controller such that low electric power, which is lower than the normal electric power, is supplied to at least the motor, and controls the display to display the amount information associated with the predetermined residual capacity value in the memory as the information related to the residual capacity of the battery.

6. The printer according to claim 5, wherein
    the memory stores a first predetermined residual capacity value and a second predetermined residual capacity value that is lower than the first predetermined residual capacity value, and first amount information and second amount information respectively associated with the first predetermined residual capacity value and the second predetermined residual capacity value, and
    in a case where the processor determines that the residual capacity of the battery is less than the first predetermined residual capacity value and not less than the second predetermined residual capacity value, the processor controls the charging and discharging controller such that the low electric power is supplied to at least the motor, and
    in a case where the processor determines that the residual capacity of the battery is less than the second predetermined residual capacity value, the processor controls the charging and discharging controller such that the low electric power is supplied to at least the motor.

7. The printer according to claim 6, wherein
    in a case where the processor determines that the residual capacity of the battery is less than the first predetermined residual capacity value and not less than the second predetermined residual capacity value, the processor controls the display to display the first amount information as the information related to the residual capacity of the battery, and in a case where the processor determines that the residual capacity of the battery is less than the second predetermined residual capacity value, the processor controls the display to display the second amount information as the information related to the residual capacity of the battery.

8. The printer according to claim 7, wherein
    the memory further stores a third predetermined residual capacity value that is lower than the second predetermined residual capacity value, and
    in a case where the processor determines that the residual capacity of the battery is less than the second predetermined residual capacity value and not less than the third predetermined residual capacity value, the processor controls the charging and discharging controller such that the low electric power is supplied to at least the motor, and in a case where the processor determines that the residual capacity of the battery is less than the third predetermined residual capacity value, the processor controls the charging and discharging controller such that electric power is not supplied to at least the motor from the battery.

9. The printer according to claim 7, further comprising a switch that receives a signal for supplying the low electric power to at least the motor,
    wherein, in a case where the processor determines that the measured residual capacity of the battery is less than the second predetermined residual capacity value and is not less than the third predetermined residual capacity value, and the switch receives the signal, the processor controls the charging and discharging controller such that the low electric power is supplied to at least the motor.

10. The printer according to claim 1, further comprising:
a memory that stores the predetermined residual capacity value in association with the amount information corresponding to the length of the printing medium that can be printed based on the residual capacity of the battery when the residual capacity of the battery is less than the predetermined residual capacity value, and
the processor controls the display such that the length of the printing medium is displayed.

11. The printer according to claim 1, wherein
the processor controls to display:
first information indicating a first length of the printing medium that can be printed when conveyed at a first speed according to the residual capacity of the battery, when the processor determines that the residual capacity of the battery is not less than the predetermined residual capacity value, and
second information indicating a second length of the printing medium that can be printed when conveyed at a second speed that is lower than the first speed, according to the residual capacity of the battery, when the processor determines that the residual capacity of the battery is less than the predetermined residual capacity value.

12. The printer according to claim 11, wherein, when the second information is displayed, the printing medium is conveyed at the second speed for printing.

13. The printer according to claim 12, wherein, when the processor at least twice determines in succession that the residual capacity of the battery, as measured by the measuring device, is less than the predetermined residual capacity value, the processor controls the display to display the second information.

14. The printer according to claim 13, wherein, when conveying speed for the printing medium is changed from the first speed to the second speed, the processor sends notification of the change in the conveying speed to an external terminal from which the processor acquires printing data for printing on the printing medium.

* * * * *